US010440597B2

(12) United States Patent
Myron et al.

(10) Patent No.: US 10,440,597 B2
(45) Date of Patent: Oct. 8, 2019

(54) LOCAL MONITORING OF CELLULAR BASE STATIONS

(71) Applicant: T-Mobile USA, Inc., Bellevue, WA (US)

(72) Inventors: Peter P. Myron, Renton, WA (US); Samson Kim-Sun Kwong, Bellevue, WA (US); Michael J. Mitchell, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/878,133

(22) Filed: Jan. 23, 2018

(65) Prior Publication Data
US 2019/0230532 A1    Jul. 25, 2019

(51) Int. Cl.
| | |
|---|---|
| *H04W 24/08* | (2009.01) |
| *H04W 24/04* | (2009.01) |
| *H04L 12/24* | (2006.01) |
| *H04W 84/04* | (2009.01) |
| *H04W 88/08* | (2009.01) |
| *H04W 88/02* | (2009.01) |

(52) U.S. Cl.
CPC ......... *H04W 24/08* (2013.01); *H04L 41/5025* (2013.01); *H04W 24/04* (2013.01); *H04W 84/042* (2013.01); *H04W 88/02* (2013.01); *H04W 88/08* (2013.01)

(58) Field of Classification Search
CPC ..... H04W 24/08; H04W 24/04; H04W 88/02; H04W 84/042; H04L 41/5025
USPC ......................................... 455/423, 425, 426
See application file for complete search history.

(56) References Cited

U.S. PATENT DOCUMENTS

| | | | |
|---|---|---|---|
| 6,885,640 B2 * | 4/2005 | Pinola ................... | H04W 24/00 370/241 |
| 2002/0098859 A1 * | 7/2002 | Murata ............. | H04W 52/0277 455/522 |

(Continued)

OTHER PUBLICATIONS

Office action for U.S. Appl. No. 15/877,718, dated Jan. 25, 2019, Myron, "Cellular Base Station Monitoring", 11 pages.

(Continued)

*Primary Examiner* — Marisol Figueroa
(74) *Attorney, Agent, or Firm* — Lee & Hayes, P.C.

(57) ABSTRACT

Monitoring devices, which in some cases may comprise smartphones, are placed at base stations of a cellular communications network to report base station information. Each monitoring device is configured to periodically determine whether its associated base station is operating correctly, or whether there is some type of anomaly at the base station. As long as there is no anomaly, the monitoring device repeatedly sends status messages to a support service of the cellular communications network. Each such status message indicates that the monitoring device has performed an analysis and has determined there is no serious anomaly at the base station. The support service monitors status messages from multiple monitoring devices. If the support service does not receive a status message within a given period of time, the support service may alert service personnel and/or automatically dispatch support resources to the base station or trigger diagnostics and/or corrective measures.

20 Claims, 5 Drawing Sheets

(56) References Cited

U.S. PATENT DOCUMENTS

2012/0058777 A1* 3/2012 Nguyen ................ H04W 24/02
  455/456.1
2015/0031307 A1   1/2015 Gao et al.
2015/0201341 A1* 7/2015 Nunokawa ............ H04W 24/08
  455/67.13
2017/0156169 A1* 6/2017 Lakshmi Narayanan ...................
  H04W 24/04
2017/0188250 A1   6/2017 Stevens et al.

OTHER PUBLICATIONS

Office action for U.S. Appl. No. 15/877,718, dated Aug. 8, 2018, Myron, "Cellular Base Station Monitoring", # pages.

* cited by examiner

LOCAL MONITORING OF CELLULAR BASE STATIONS

BACKGROUND

A cellular communications provider may have thousands of geographically distributed cell sites and corresponding base stations. Maintenance of the base stations can be expensive, and the costs of sending maintenance crews to malfunctioning base stations can be a significant component of overall maintenance costs. However, it can at times be difficult for a provider to accurately assess the status of a base station. In particular, it can be difficult to detect base station outages or situations in which base station functionality has been impaired.

In some situations, it may be possible to query the base station itself to obtain performance parameters, and to analyze the performance parameters to detect service impairments. However, some operators may avoid doing this because it can consume significant bandwidth. In addition, obtaining and analyzing performance parameters from hundreds or thousands of base stations may call for a large amount of processing power. Furthermore, performance indicators received from the base station may not be accurate or reliable in that they are generated by the base station, which itself might be malfunctioning.

The difficulty in remotely assessing base station status may result in undetected outages, which may negatively affect user experiences. In addition, false alarms and difficulty in determining base station status may result in needlessly dispatching a service crew to a site or in sending the wrong type of service crew.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

The described implementations provide devices, systems, and methods to determine base station status at the cell sites of a cellular communications network, and to alert service personnel to the possibility of outages or malfunctions of the base stations.

In a described embodiment, monitoring devices are placed at the base stations of multiple cell sites of the cellular communications network. For example, a monitoring device may be placed within a base station enclosure or in an independent enclosure at or near the base station. The monitoring devices may have connections to mains power, but may also have battery backup so that they can receive power even during outages of the mains power.

The monitoring devices may have cellular communication capabilities, enabling them to communicate with a support service of the cellular communications network using the wireless communication capabilities of the provider's network or of another provider's network. The monitoring devices may in some cases also, or alternatively, be connected to communicate over a wide-area network such as the Internet.

In certain embodiments, each monitoring device comprises a programmable telecommunications handset, such as a smartphone, that has been manufactured and distributed for use by consumers. A mobile device such as this inherently has battery backup, and can detect when it is no longer receiving mains power. A device like this also has cellular wireless capabilities, as well as various sensors that may be used to detect conditions and events that may either cause a base station fault or that may be symptomatic of a base station fault. Furthermore, devices such as this may be readily available to cellular service providers at reasonable prices.

Generally, a handset is configured to obtain data, referred to herein as site data, regarding the environment and operation of an associated base station, and to analyze the data to detect any existing anomalies such as faults and malfunctions, conditions or events that might cause faults or malfunctions, and/or conditions or events that might be symptomatic of faults or malfunctions. In some embodiments, the site data may be obtained by observation and measurement, rather than by querying the base stations themselves.

Each handset is configured to periodically send a status message to a central support service of the cellular communications network, indicating the operational status of the base station. Communications between the handset and the central support service may be via the cellular network itself, using the cellular communication capabilities of the handsets.

In certain embodiments, the status message is limited to a "Status-OK" notification, indicating that the base station is functioning within acceptable parameters. When a monitoring device detects an anomaly at a base station, the monitoring device ceases sending Status-OK notifications to the support service. Limiting the status messages to this type of binary information minimizes or reduces the bandwidth consumed by data messages from multiple monitoring devices to the support service. It is possible to limit the status messages in this manner because the monitoring handsets are being used locally to obtain and analyze site data and to evaluate whether the corresponding base stations are functioning within desirable parameters.

The support service receives Status-OK notifications from multiple monitoring devices regarding respectively corresponding base stations. Each Status-OK notification represents an analysis performed by a handset and a conclusion by the handset that the corresponding base station is functioning in an acceptable manner.

The support service monitors the Status-OK notifications from the various handsets and detects any instance where a Status-OK notification has not been received from an individual handset for some length of time. Upon determining that a Status-OK notification has not been received from a monitoring device for some time, the support service raises an alert or alarm for service personnel, who may respond by visiting the site of the corresponding base station to investigate and to restore the base station to an operable condition.

The placement such as this of relatively inexpensive monitoring devices, such as commercial-type smartphones, allows monitoring of many base stations at a relatively low cost and may provide diagnostic information that has not previously been available to service providers. Monitoring in this manner can increase the chances that a base station outage or service degradation will be detected quickly as well as decreasing the chances of false alarms.

Figure 1:
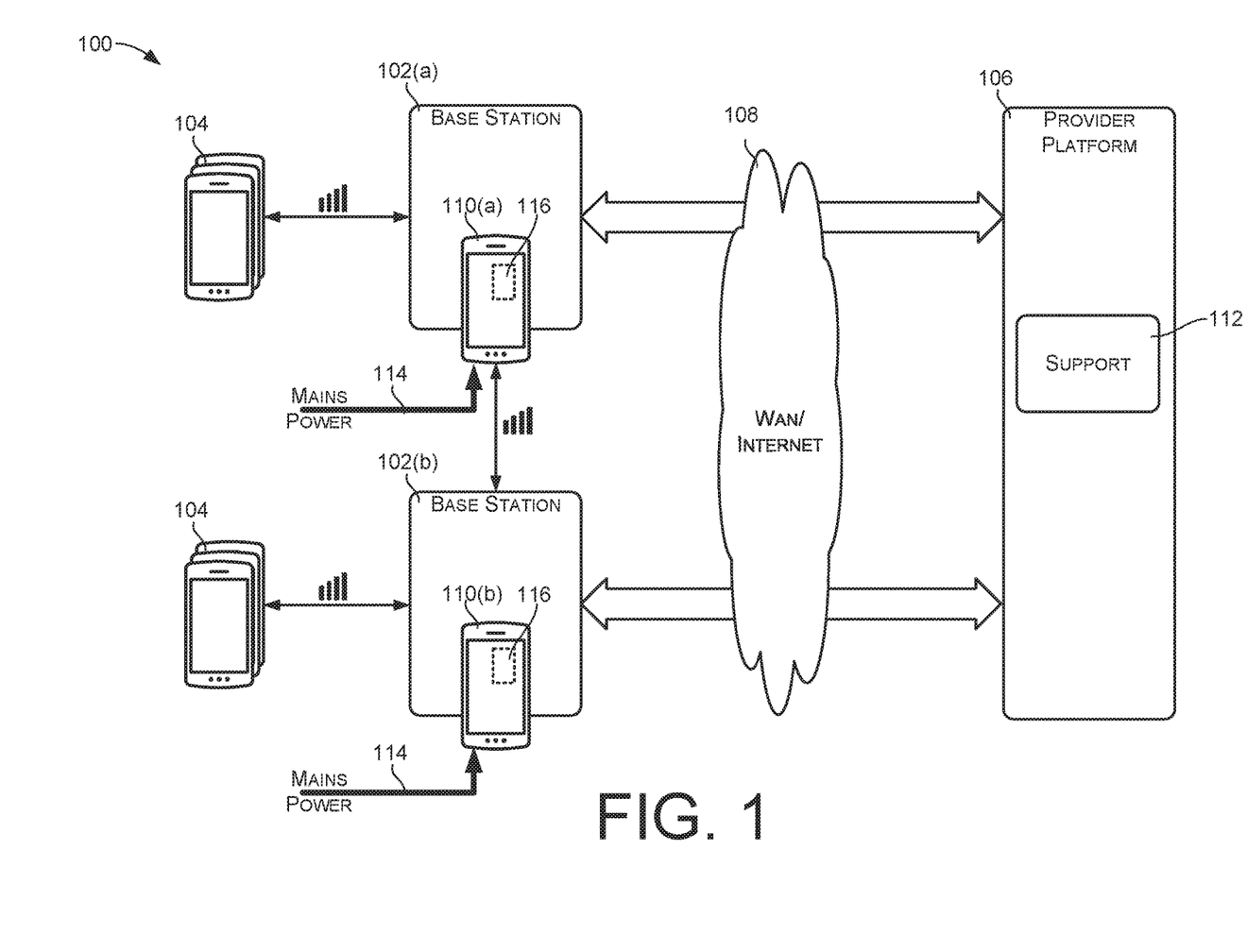
FIG. 1 is a block diagram of an example configuration that enables the detection of operating anomalies at multiple base stations of a cellular communications network.

FIG. 1 illustrates an example of a wireless, cellular communications network 100 such as may be implemented by a wireless service provider. The cellular communications network 100 comprises multiple base stations 102. The base stations 102 communicate wirelessly with multiple user devices 104, and connect the user devices 104 with a provider platform 106 so that the devices 104 can communicate with each other and with user devices of other provider networks. For purposes of discussion, FIG. 1 shows two base stations 102, referred to herein as a first base station 102(a) and a second base station 102(b). The first base station 102(a) may also be referred to herein as a monitored base station. The second base station 102(b) may be referred to herein as a neighboring base station.

The provider platform 106, as an example, may comprise components of a GSM communication network, including a core network and other components typical of such communication networks. The base stations 102 communicate with the provider platform 106 through a wide-area network (WAN) 108 such as the Internet, or through any other backhaul communications channel.

A monitoring device 110 is placed at each of the base stations 102. FIG. 1 shows two monitoring devices 110(a) and 110(b), placed at and associated with the first and second base stations 102(a) and 102(b), respectively. The following discussion will refer to the operation and characteristics of the monitoring device 110(a), with it being understood that other monitoring devices, associated respectively with different base stations, may also operate as described.

In certain embodiments, the monitoring devices 110 may comprise programmable telecommunication handsets such as smartphones, which are configured by way of programming to perform the methods described below. For example, each of the monitoring devices 110 may be configured to initiate an application at startup, where the application runs continuously to perform the actions that are described herein as being performed by the monitoring devices 110.

The monitoring devices 110 may be powered by mains power 114. More specifically, each of the monitoring devices 110 may be configured to operate from a direct-current power supply, which in turn is powered by the mains power 114.

In addition, each monitoring device 110 has a backup power supply 116, such as an internal battery, from which the monitoring device 110 receives power during outages of the mains power 114. This allows the monitoring devices 110 to detect and report anomalies, including power outages, even when there is no mains power.

In some cases, the monitoring device 110(a) may be placed within an enclosure of the monitored base station 102(a). In other cases, the monitoring device 110(a) may be placed in close proximity to the monitored base station 102(a) or to the cell site at which the monitored base station 102(a) is located. In yet other cases, the monitoring device 110(a) may be placed at any location that is within the radio coverage area of the monitored base station 102(a). In some cases, the monitoring device 110(a) may be located within a tamperproof enclosure to protect from theft or vandalism.

Although the monitoring devices 110 are described as being a consumer-type mobile communications devices, the monitoring devices 110 may comprise any type of computing devices, such as a small single board computers and associated peripheral devices, that are able to detect or sense information relevant to the operation of the associated base stations 102.

The monitoring device 110(a) is configured to communicate with a support service 112 of the provider platform 106 using the wireless, cellular communication capabilities of the monitoring device 110(a) and the network 100. More specifically, the monitoring device 110(a) is capable of communicating through the different base stations 102 of the cellular communications network 100. The base stations of a cellular communications network often have overlapping coverage, so that the first monitoring device 110(a) may be able to utilize both of the first and second base stations 102(a) and 102(b) for communicating with the support service 112. In some situations, the monitoring device 110(a) may be within coverage areas of several base stations, all of which are considered to be neighboring base stations.

The support service 112 may comprise any component, entity, or function that is associated with the cellular communications network or the cellular communications network provider.

The monitoring device 110(a) is configured to obtain site data, which specifies anomalies, conditions, events, and/or signal characteristics of or at the monitored base station 102(a). The monitoring device 110(a) is further configured to analyze the site data and to detect any existing site anomalies based on the site data. For example, the monitoring device 110(a) may detect power outages, the cessation of signal transmissions by the monitored base station 102(a), over-temperature conditions, decreases in strengths of signals transmitted by the monitored base station, etc.

The monitoring device 110(a) is also configured to periodically send status messages to a central support service to inform the support service 112 that the monitored base station 102(a) is functioning within acceptable limits or parameters. Status messages such as this are referred to herein as "Status-OK" notifications, and each Status-OK notification represents the result of an analysis by the monitoring device 110(a) and a conclusion by the monitoring device 110(a) that no serious anomalies exist at the monitored base station 102(a).

Generally, anomalies may include, without limitation, faults and malfunctions, conditions or events that might cause faults or malfunctions, and/or conditions or events that might be symptomatic of faults or malfunctions. For example, the monitoring device 110(a) may be configured to detect an outage of the mains power 114 at the base station 102(a). As another example, the monitoring device 110(a) may be configured to analyze signals transmitted by the monitored base station 102(a) and to detect when the signals have been degraded in some manner.

The support service 112 receives Status-OK notifications from multiple monitoring devices 110. If a Status-OK notification is not received from any particular monitoring device 110 over a certain length of time, the support service 112 assumes that there is a problem with the operation of the corresponding monitored base station 102. In response, the support service 112 may alert service personnel and/or dispatch service personnel for a visit to the site of the monitored base station. In some implementations, the support service 112 may display outages or other base station problems on a displayed geographic map, such as by illuminating any location on the map where there is a problematic base station. In some implementations, the support service 112 may initiate a response, such as by initiating automated diagnostic procedures and/or initiating an attempt to correct for detected faults.

The monitoring device 110(a) may have or may have access to several types of sensors for detecting anomalies. For example, smartphones may have sensors allowing the detection of temperature, electro-magnetic interference (EMI), movement, vibration, orientation, humidity, barometric pressure, etc. In addition, a smartphone may have access to additional sensors that are accessed through wireless interfaces such as Bluetooth interfaces.

In addition to monitoring its sensors, the monitoring device 110(a) may be configured by way of programming to analyze data transmissions of the monitored base station 102(a). For example, a smartphone may use its cellular radio capabilities to determine signal information, such as data rates or throughputs of the monitored base station 102(a), communication latencies, signal strengths, numbers of connections, and so forth. This may be done by observing and analyzing transmissions of the monitored base station 102(a) rather than by communicating with components of the monitored base station 102(a).

The monitoring device 110(a) may also be configured to monitor the cell ID of the base station to which it is attached for communications, as an indication of whether the monitored base station 102(a) is operational. For example, assuming the monitoring device 110(a) is a smartphone, the smartphone may be configured to operate so that it communicates using the strongest or best available signal, which should in most cases be a signal from the monitored base station 102(a). The smartphone may be further configured to detect a situation in which the current cell ID of the smartphone is not the cell ID of the monitored base station 102(a), and to treat this situation as an anomaly.

As another example, the monitoring device may be configured to detect power outages at the site of the monitored base station 102(a), and to treat any power outage as an anomaly. In the case of a smartphone, a power outage may be detected by detecting that the smartphone is no longer receiving external power, and instead is operating from battery power.

Figure 2:
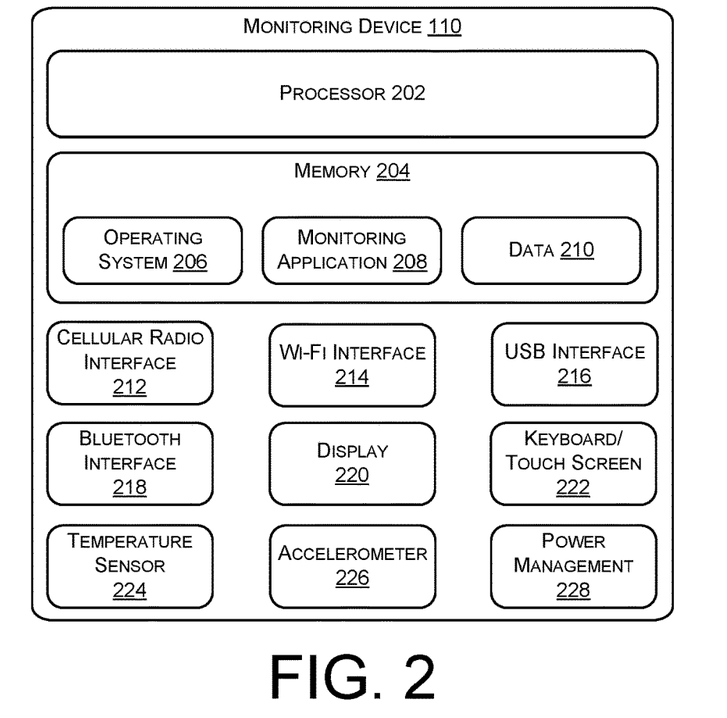
FIG. 2 is a block diagram of a programmable telecommunications device that may be used in certain implementations described herein.

FIG. 2 illustrates high level components and functionality of an example monitoring device 110, which as described above may in some cases comprise a mobile handset, smartphone, or other device having wireless communication capabilities.

The device 110 has a processor 202 that is programmed by means of programs stored in memory 204. The processor(s) 202 may comprise one or more central processing units (CPUs) or processing cores, one or more graphics processing units (GPUs), and/or any other processors that may be available for executing programs.

The programs may include an operating system 206 that supports basic functionality of the device 110, such as initiating applications, providing support for applications, managing power, network communications, interfacing with peripheral devices, etc. The programs stored in the memory 204 may also include one or more applications, which in this case include a monitoring application 208. The monitoring application 208 comprises computer-readable instructions that are executable by the processor 202 to perform the actions described herein as being performed by the monitoring device 110(a). Note that certain functions of the monitoring application 208 may be supported by elements of the operating system 206 and/or other software components residing on the monitoring device 110.

The memory 204 may also be used to store various types of data 210. The data 210 may be created and/or used by components of the operating system 206 as well as by programs such as the monitoring application 208.

In various embodiments, the memory 204 may comprise one or more machine-readable media, which may in turn include volatile and/or non-volatile memory. The memory 204 can also be described as non-transitory computer storage media and may include removable and non-removable media implemented in any method or technology for storage of information, such as computer readable instructions, data structures, program modules, or other data.

Non-transitory computer-storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium that can be used to store the desired information and that can be accessed by the device 110, including network-accessible storage.

The monitoring device 110 may include various types of communication interfaces, which in this example include a wireless cellular network interface 212. The wireless cellular network interface 212 may include radio transceivers that perform the function of transmitting and receiving radio frequency communications via an antenna. The cellular network interface 212 facilitates wireless connectivity between the device 110 and various base stations. of the cellular communications network. The cellular network interface 212 may also be used to monitor data transmissions of base stations to obtain performance parameters such as data transfer speed, communication latencies, signal strength, and so forth.

The monitoring device 110 may in some cases also have a Wi-Fi interface 214, which may be used to communicate through a Wi-Fi network when such a network is available.

The monitoring device 110 may have additional interfaces, such as a USB interface 216 and a Bluetooth interface 218, which may be used for communications with peripherals and other devices such as environmental sensors. In some implementations, the device 110 may have or may be connected to an Ethernet interface (not shown), which may be used to communicate with the provider platform 106 through the wide-area network 108.

The monitoring device 110 in the described example implements a user interface through a display 220 and a keyboard or touch screen 222. In various embodiments, the display 220 may comprise a liquid crystal display or any other type of display commonly used in telecommunication devices or other portable devices. For example, the display 220 may be a touch-sensitive display screen, which may also act as an input device or keypad, such as for providing a soft-key keyboard, navigation buttons, or the like.

The monitoring device 110 may have various types of sensors. For example, FIG. 2 shows the monitoring device 110 having a temperature sensor 224 and an accelerometer 226. The temperature sensor 224 may be used to detect excessive or abnormal temperatures at an associated base station. The accelerometer 226 may be used to detect vibrations, including seismic events, at the associated base station 102. The monitoring device 110 may have additional sensors that are not shown, or may have access to additional sensors by way of the USB interface 216 and/or the Bluetooth interface 218. Additional environmental sensors might include infrared sensors, optical sensors, oxygen sensors, air quality sensors, etc. Detected environmental conditions may include, as non-limiting examples:

a power outage;
abnormal temperature;
a seismic event;
water;
abnormal humidity;
vibration;
movement;
electromagnetic interference (EMI);
etc.

The monitoring device 110 may also have a power management component 228. The power management component 228 controls battery charging and can be queried to determine whether the monitoring device 110 is receiving external power. The absence of external power may be taken as an indication of a power outage at the site of the monitoring device 110.

The monitoring device 110 may include various other physical and functional components that are not shown in FIG. 2.

Figure 3:
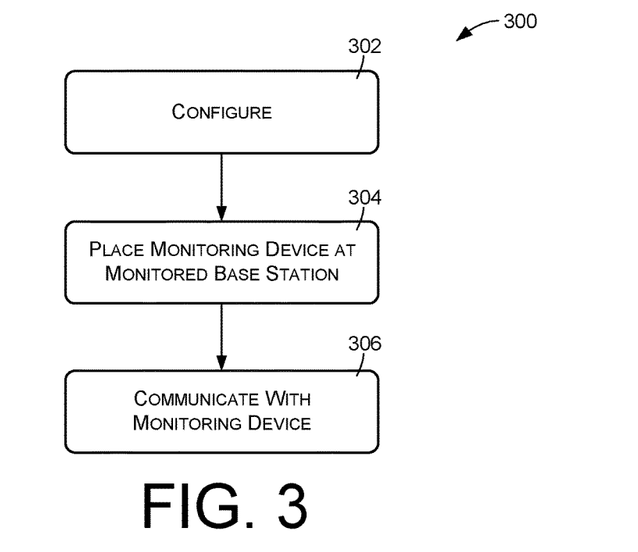
FIG. 3 is a flow diagram showing an example method of using multiple monitoring devices to monitor respectively corresponding base stations.

FIG. 3 illustrates an example method 300 that may be performed by a wireless service provider, or by personnel of the wireless service provider, in order to monitor multiple base stations. The method 300 may be performed multiple times, for multiple base stations of a cellular communications network, so that a monitoring device 110 is configured for and placed at each of the base stations.

An action 302 comprises configuring a monitoring device 110. The action 302 may comprise provisioning a smartphone or other programmable communications handset to operate as part of the cellular communications network 100. The action 302 may also include specifying one or more cell IDs of the base station 102 that the monitoring device 110 is intended to monitor. As an example, the monitoring device 110 may be configured by way of an application to automatically detect multiple signals, from one or more of the base stations 102, and to display the cell IDs corresponding to the detected base stations 102. A technician may select one or more of the cell IDs, corresponding to base stations 102 that should be monitored by the monitoring device 110. The monitoring device 110 remembers the selection, and uses the selected cell IDs to identify the selected base station 102 in Status-OK notifications.

An action 304 comprises placing the monitoring device 110 at a monitored base station 102. The monitoring device 110 may be placed within an enclosure of the monitored base station 102 or in a separate enclosure near the enclosure of the monitored base station 102. In some cases, the monitoring device 110(*a*) may be placed within a tamperproof enclosure to prevent theft and vandalism.

An action 306, performed by a support service or other functional element associated with the cellular communications network 100, comprises receiving Status-OK notifications from the monitoring device 110(*a*). The support service 112 may also receive other communications from the monitoring device 110(*a*), including notifications of anomalies and site data relevant to anomalies.

The method 300 is performed for multiple base stations 102 and corresponding monitoring devices 110 so that the support service 112 communicates with and receives Status-OK notifications from multiple base stations 102.

Figure 4:
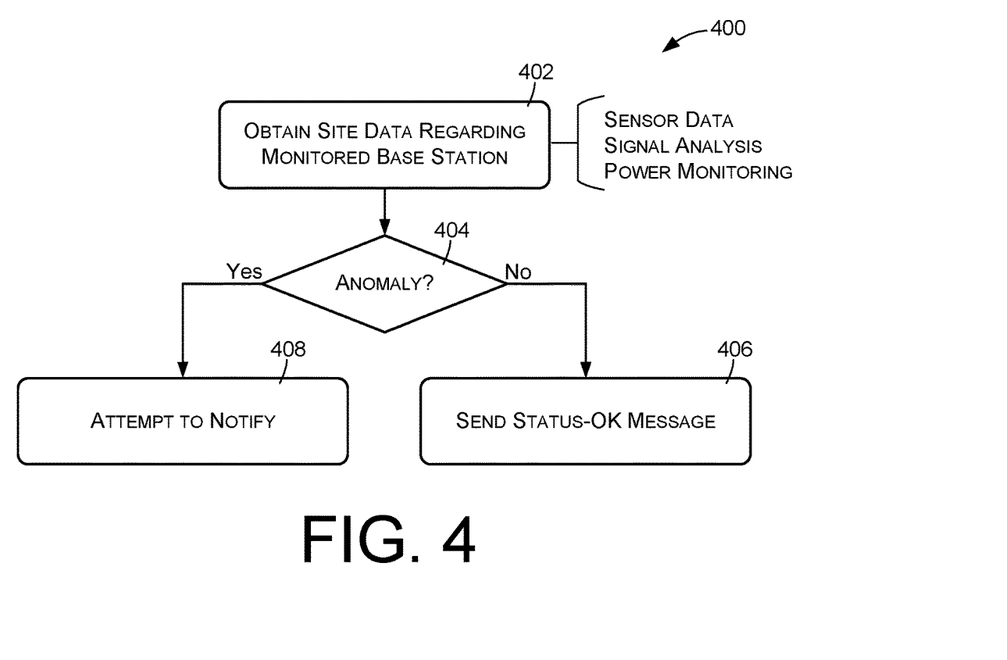
FIG. 4 is a flow diagram showing an example method of reporting base station status to a support service of a cellular communications network.

FIG. 4 illustrates an example method 400 showing how a monitoring device 110 may be configured to periodically indicate that an associated base station 102 is functioning, and to cease to periodically indicate that the associated base station is functioning in response to detecting an anomaly at the associated base station. The example method 400 will be described as being performed with respect to the first base station 102(*a*) by the corresponding monitoring device 110(*a*). However, the method 400 may be performed independently by multiple monitoring devices 110, with respect to respectively corresponding base stations 102.

An action 402 comprises obtaining site data regarding operation of the monitored base station 102(*a*). Generally, site data may indicate sensor data, calculated parameters and metrics, detected anomalies, and/or any other relevant information available to the monitoring device 110(*a*). For example, site data may indicate ambient or internal temperature, power supply voltage and current, water detection, vibration, humidity, signal strength, power supply voltage, component temperatures, etc. Site data may also, or alternatively, indicate and identify a specific environmental condition that has the potential for impairing the monitored base station 102(*a*), such as a high temperature, the presence of water, or a power outage. Site data may in some cases include the cell ID of the base station to which the monitoring device 110(*a*) is attached.

Site data may in some cases include parameters or metrics that are determined based on the analysis of radio transmissions by the monitored base station 102(*a*). For example, the action 402 may comprise receiving, using the wireless cellular network interface 212 of the monitoring device 110(*a*), one or more wireless data signals that have been transmitted by the monitored base station 102(*a*) for communicating with mobile devices other than the monitoring device 110(*a*), and analyzing the wireless data signals to determine performance parameters such as data rates, bandwidths, loading, throughput, latencies, etc. In some cases, these metrics and parameters may be obtained solely by observation, without communicating between the monitoring device 110(*a*) and the monitored base station 102(*a*). Cellular radio components of the monitoring device 110(*a*) may be used for receiving and analyzing wireless data signals from the monitored base station 102(*a*).

As a further example, the action 402 may include analyzing wireless data signals transmitted by the monitored base station 102(*a*) in order to detect the cessation of cellular data transmissions by the monitored base station 102(*a*). The site data may in this case include an indication that the monitored base station 102(*a*) has ceased transmissions of cellular data signals.

The action 402 may include receiving information from power monitoring/management components of the monitoring device 110(*a*) in order to detect times during which the monitoring device 110(*a*) is not receiving external power, which may indicate a power outage at the monitored base station 102(*a*). The action 402 may comprise determining that there is an outage of the mains power 114 at the monitored base station, and the site data may indicate the outage. As described above, the monitoring device 110(*a*) may continue to operate during power outages by receiving power from its battery.

An action 404 comprises detecting an anomaly at the monitored base station 102(*a*). The action 404 may be based on any of the site data described above.

As an example, the action 404 may comprise comparing performance metrics to corresponding thresholds. An anomaly in this example might be indicated by any performance metric that is outside of a specified threshold or boundary.

In some cases, the action 404 may be performed without communication between the monitoring device 110(*a*) and the monitored base station 102(*a*), by analyzing wireless data signals transmitted by the monitored base station 102(*a*). Wireless data signals may be analyzed to detect performance metrics such as data transmission rates, data throughput, communication latencies, signal strengths, etc.

As another example, the action 404 may comprise detecting an inability of the monitoring device 110(*a*) to connect to the cellular communications network 100 through the monitored base station 102(*a*). More specifically, the action 404 may comprise detecting an inability of the monitoring device 110(*a*) to connect or attach to the monitored base station 102(*a*) or detecting that the monitoring device 110(*a*) has attached to a base station other than the monitored base station, such as will be described below with reference to FIG. 5. As yet another example, the action 404 may include detecting the cessation of data transmissions by the monitored base station 102(*a*).

As further examples, the action 404 may include detecting power outages, detecting over-temperature situations, detecting seismic events, detecting moisture or water, etc.

If an anomaly is not detected in the action 404, the monitoring device 110(*a*) sends a status message, referred to herein as a Status-OK notification, to the support service 112. The Status-OK notification signifies that the monitored base station 102(*a*) is functioning, and/or that the monitored base station 102(*a*) is functioning within permissible or desirable limits.

In response to the detection of an anomaly, the monitoring device 110(*a*) may in some cases perform an action 408, which comprises attempting to notify the support service 112 of the detected anomaly. In some cases, the action 408 may be initiated by the monitoring device 110(*a*). In other cases, the action 408 may be performed in response to a query received from the support service 112. In some cases, particularly in situations in which the monitored base station 102(*a*) is inoperative, the monitoring device 110(*a*) may be unable to communicate with the support service 112. In cases such as this, the continued failure to receive a Status-OK notification from the monitoring device 110(*a*) signifies to the support service 112 that there is a problem at the monitored base station 102(*a*).

Figure 5:
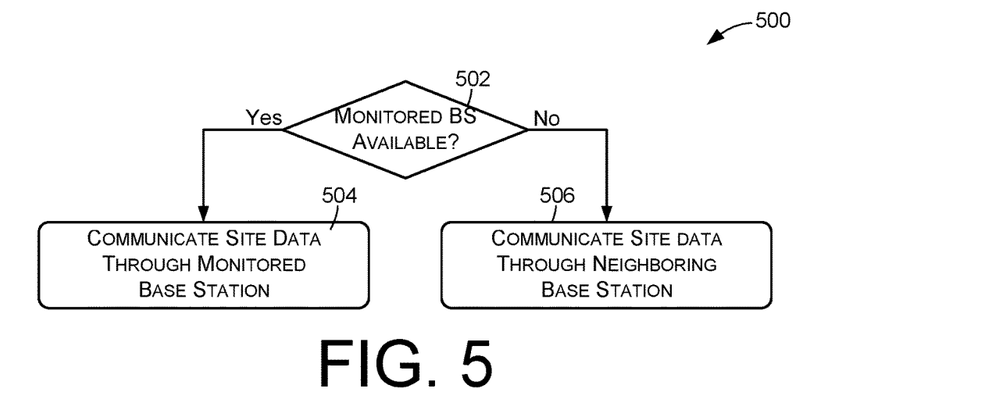
FIG. 5 is a flow diagram showing an example method of communicating between a monitoring device and a support service of the cellular communications network.

FIG. 5 illustrates an example method 500 that may be performed by the monitoring device 110(*a*) in some implementations to communicate with the support service 112. An action 502 comprises determining whether the monitored base station 102(*a*) is available for communications with the support service 112. For example, the monitoring device 110(*a*) may attempt to attach to the monitored base station 102(*a*) for cellular communications. In response to determining that the monitored base station 102(*a*) is available for use by the monitoring device 110(*a*), an action 504 is performed of communicating wirelessly with the support service 112 through the monitored base station 102(*a*). That is, the monitoring device 110(*a*) establishes a cellular data connection through the monitored base station 102(*a*) and transmits data and/or notifications to the monitored base station 102(*a*), from where it is eventually communicated to the support service 112. Specifically, the action 504 may include sending a Status-OK notification, or in some cases may include sending information regarding a detected anomaly.

In response to determining that the monitored base station 102(*a*) is not operational or not available for attachment, an action 506 is performed of communicating, using the wireless cellular network interface of the monitoring device 110(*a*), with the support service 112 through a base station other than the monitored base station 102(*a*), such as through the neighboring base station 102(*b*). That is, the monitoring device 110(*a*) establishes a cellular data connection through the neighboring base station 102(*b*) and transmits the data and/or notifications to the neighboring base station 102(*b*), from where it is eventually communicated to the support service 112. Note that the neighboring base station 102(*b*) may be a base station associated with the provider platform 106, or may be a base station associated with another provider platform.

Using the method 500, communications may in some cases be maintained between the monitoring device 110(*a*) and the provider platform 106 even when the monitored base station is inoperative. Note that in some implementations, the monitoring device 110(*a*) may be configured to communicate through the neighboring base station (*b*) by default, rather than trying first to communicate through the monitored base station 102(*a*). Also note that when the monitoring device 110(*a*) is a smartphone, selection of base stations in this manner happens automatically.

Figure 6:
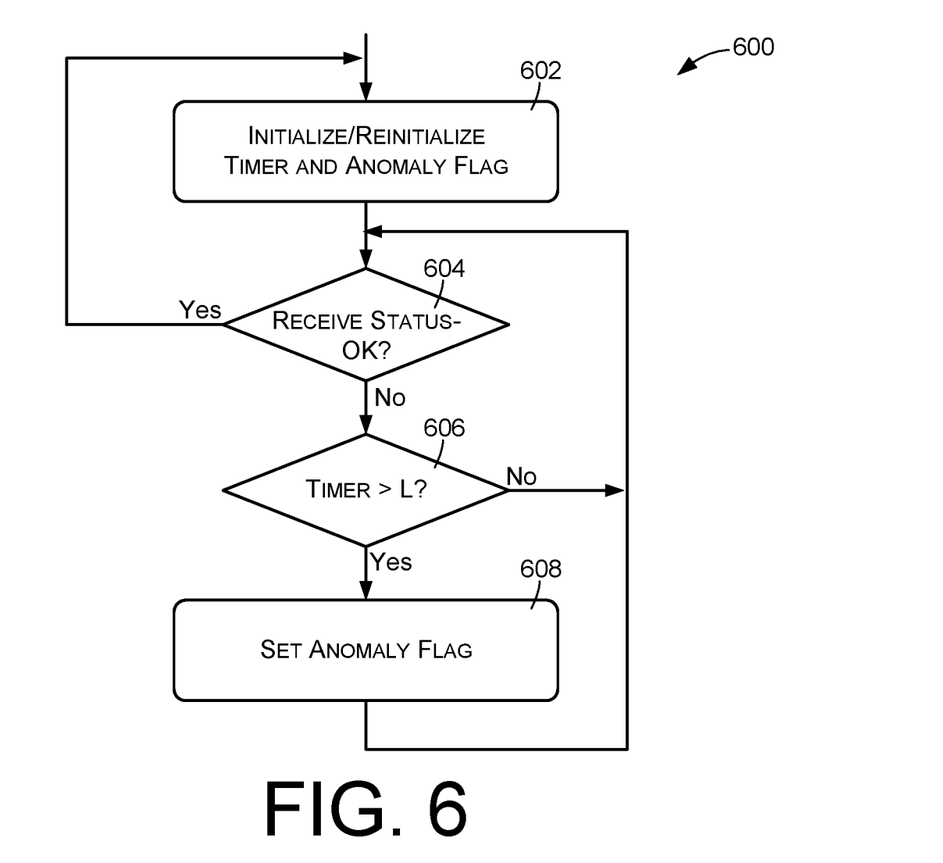
FIG. 6 is a flow diagram showing an example method that may be performed by a monitoring device to report base station status to the support service.

FIG. 6 illustrates an example method 600 that may be implemented by the support service 112 to detect and respond to anomalies at monitored base stations. An action 602 comprises initializing or reinitializing a timer and an anomaly flag. The timer will be used to measure the time from receiving the most recent Status-OK notification from the monitoring device 110(*a*). The anomaly flag will be used as an indication to various functional entities that an anomaly has been detected at the monitored base station 102(*a*). The timer is initialized to zero. The anomaly flag is initialized to FALSE.

An action 604 comprises determining whether a new Status-OK notification has been received from the monitoring device 110(*a*). If at any time a Status-OK notification is received from the monitoring device, the action 602 is repeated of initializing or reinitializing the timer to the value zero and the anomaly flag to the value FALSE.

If a new Status-OK notification has not been received, an action 606 is performed of determining whether a Status-OK notification has been received in a preceding period or length of time. More specifically, in the illustrated example the action 606 comprises determining whether the timer has a value that is greater than a predetermined length L. If the timer has not exceeded the value L, which may be on the order of several seconds or several minutes, the action 604 is repeated. In response to determining that the timer has exceeded the value L, which indicates that a Status-OK notification has not been received for the length of time L, an action 608 is performed of indicating that there is an anomaly at the monitored base station 102(*a*). In the illustrated example, this is performed by setting the anomaly flag to the value TRUE. Note that in some cases, setting the anomaly flag to TRUE may serve to notify one or more functional components of a detected anomaly.

After the action 608 of setting the anomaly flag to TRUE, execution of the method returns to the action 604.

The method 600 results in the setting of the anomaly flag to TRUE whenever a Status-OK has not been received from the monitoring device 110(a) for a given length of time L, and resetting the anomaly flag to FALSE whenever a Status-OK notification is received from the monitoring device 110(a).

Figure 7:
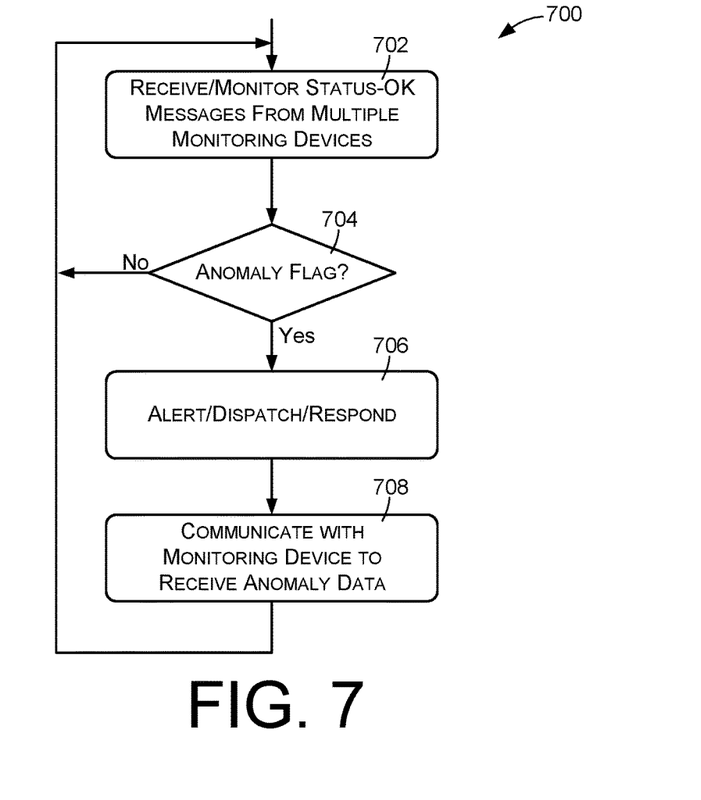
FIG. 7 is a flow diagram showing an example method that may be performed by the support service to detect anomalies at base stations of the cellular communications network.

FIG. 7 illustrates an example method 700 that may be performed by the support service 112 in order to notify components and/or personnel that an anomaly has been detected at a monitored base station 102.

An action 702 comprises receiving and/or monitoring Status-OK notifications from multiple monitoring devices, in accordance with the method 600 of FIG. 6.

An action 704 comprises determining whether an anomaly flag has been set for any of the monitored base stations 102. If a flag is set, indicating an anomaly detected at a particular base station, an action 706 is performed of generating an alert to service personnel. The alert may be an audible alarm in a monitoring center, as an example. As another example, the alert may comprise an indication on a graphical display or dashboard. In some embodiments, the action 706 may also, or alternatively, comprise dispatching service personnel for a service visit to the site of the base station at which an anomaly has been detected. Service personnel may be dispatched, for example, by sending text messages, emails, or other notifications to personal devices of the personnel, such as smartphones of the personnel. As another example, the action 706 may comprise initiating an automated response, such as by initiating diagnostic procedures and/or attempting corrective actions.

In some cases, an action 708 may also be performed, comprising communicating with the monitoring device 110(a) to receive data regarding any detected anomaly. As noted above with reference to FIG. 5, these communications may be through either the monitored base station 102(a) or through a neighboring base station such as the base station 102(b). However, it may not always be possible to perform the action 708, such as in situations where the monitoring device 110(a) is unable to attach to any base station.

Figure 8:
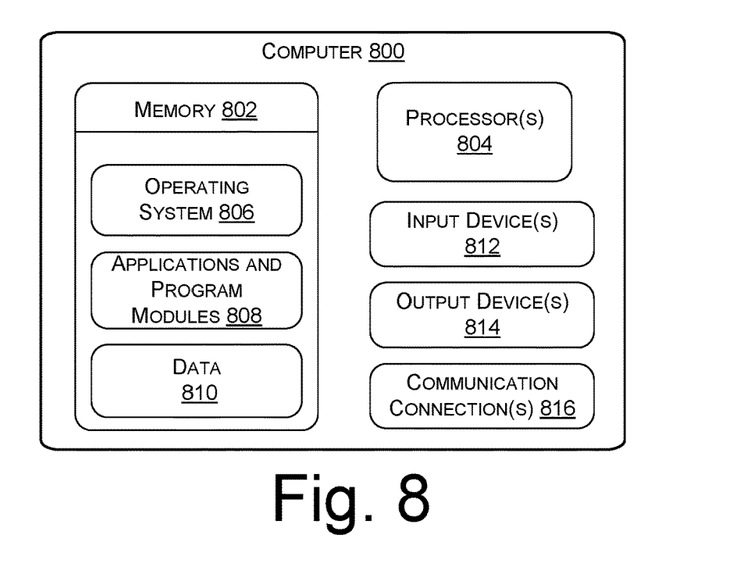
FIG. 8 is a block diagram of a computing device that may be used to implement functional components of a telecommunications provider platform, including a support service of the telecommunications platform.

FIG. 8 is a block diagram of an illustrative computer 800, which may be configured as a computer server to implement various component associated with the provider platform, such as the support service 112.

The computer 800 may include memory 802 and a processor(s) 804. The memory 802 may include both volatile memory and non-volatile memory. The memory 802 can also be described as non-transitory computer-readable storage media or machine-readable memory, and may include removable and non-removable media implemented in any method or technology for storage of information, such as computer executable instructions, data structures, program modules, or other data.

The memory 802 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information. The memory 802 may in some cases include storage media used to transfer or distribute instructions, applications, and/or data. In some cases, the memory 802 may include data storage that is accessed remotely, such as network-attached storage that the computer 800 accesses over some type of data communications network.

The memory 802 stores one or more sets of instructions (e.g., software) such as a computer-executable program that embodies operating logic for implementing and/or performing any one or more of the methodologies or functions described herein. The instructions may also reside at least partially within the processor 804 during execution thereof by the computer 800.

Generally, the instructions stored in the memory 802 may include an operating system 806, various applications and program modules 808, and various types of data 810.

In some embodiments, the processor(s) 804 is a central processing unit (CPU), a graphics processing unit (GPU), both CPU and GPU, or other processing unit or component known in the art. Furthermore, the processor(s) 804 may include any number of processors and/or processing cores, and may include virtual processors, computers, or cores. The processor(s) 804 is configured to retrieve and execute instructions from the memory 802.

The computer 800 may also have input device(s) 812 such as a keyboard, a mouse, a touch-sensitive display, voice input device, etc. Output device(s) 814 such as a display, speakers, a printer, etc. may also be included. The computer 800 may also contain communication connections 816 that allow the device to communicate with other computing devices. For example, the communication connections 816 may include a network communication interface such as an Ethernet adapter, which is typically used to communicate using IP-based communication protocols with other computers 800 that implement various functionality associated with the provider platform. The communication connections may also include other types of interfaces or adapters, such as Wi-Fi interfaces.

Although features and/or methodological acts are described above, it is to be understood that the appended claims are not necessarily limited to those features or acts. Rather, the features and acts described above are disclosed as example forms of implementing the claims.

What is claimed is:

1. A method, comprising:
   communicating with multiple base stations of a cellular communications system;
   receiving notifications from multiple monitoring devices, the multiple monitoring devices corresponding respectively to the multiple base stations, wherein receipt of a notification from a particular monitoring device indicates that the particular monitoring device has analyzed site data of a corresponding base station and concluded that the corresponding base station is functioning within acceptable parameters;
   determining that a notification from an individual monitoring device, corresponding to an individual base station and received through a cellular data connection with the individual base station, has not been received for a length of time;
   in response to determining that the notification from the individual monitoring device has not been received for the length of time, indicating that there is an anomaly at the individual base station; and
   in response to indicating that there is an anomaly, communicating with the individual monitoring device through the cellular data connection to receive a portion of the site data associated with the anomaly.

2. The method of claim 1, further comprising initiating automated diagnostic procedures with the individual base station regarding the anomaly.

3. The method of claim 1, further comprising, in further response to determining that the notification from the individual monitoring device has not been received for a predetermined length of time, initiating a service visit to the individual base station to investigate the anomaly.

4. A system for monitoring a first base station of a cellular communications network, comprising:
   a telecommunications handset;
   the telecommunications handset having one or more processors;
   the telecommunications handset having non-transitory computer-readable media storing computer-executable instructions that, when executed by the one or more processors, cause the one or more processors to perform actions comprising:
   establishing a cellular connection between the telecommunications handset and the cellular communications network;
   comparing a current cellular identification associated with the cellular connection with a cellular identification for the first base station;
   repeatedly indicating to a support service of the cellular communications network that the first base station is functioning within acceptable parameters;
   detecting an anomaly at the first base station; and
   in response to detecting the anomaly, ceasing to repeatedly indicate to the support service of the cellular communications network that the first base station is functioning within the acceptable parameters.

5. The system of claim 4, the actions further comprising, in further response to detecting the anomaly, initiating a response to the anomaly.

6. The system of claim 4, wherein the detecting is performed without communicating with the first base station.

7. The system of claim 4, wherein the detecting further comprises analyzing radio transmissions of the first base station.

8. The system of claim 4, wherein the detecting further comprises obtaining data from an environmental sensor to detect one or more of:
   a power outage;
   abnormal temperature;
   a seismic event;
   water;
   abnormal humidity;
   vibration;
   movement; or
   electromagnetic interference.

9. The system of claim 4, the telecommunications handset being configured to operate from mains power, the telecommunications handset having a battery, the actions further comprising:
   determining that there is an outage of the mains power;
   operating from the battery during the outage of the mains power; and
   wherein the detecting comprises detecting that the telecommunications handset is not being powered by mains power.

10. The system of claim 4, the detecting comprising determining that the telecommunications handset is unable to connect to the cellular communications network through the first base station.

11. The system of claim 4, the detecting comprising determining that the current cellular identification associated with the cellular connection is different from the cellular identification of the first base station.

12. The system of claim 4, the actions further comprising, in further response to detecting the anomaly, communicating with the support service to indicate the anomaly to the support service, wherein the communicating is performed through a second base station other than the first base station.

13. A method performed by a telecommunications handset for monitoring a first base station of a cellular communications network, comprising:
   establishing a cellular connection between the telecommunications handset and the cellular communications network;
   comparing a current cellular identification associated with the cellular connection with a cellular identification for the first base station;
   periodically indicating, to a support service of the cellular communications network, that the first base station is functioning within acceptable parameters;
   detecting an anomaly at the first base station; and
   in response to detecting the anomaly, ceasing to periodically indicate to the support service of the cellular communications network that the first base station is functioning within acceptable parameters.

14. The method of claim 13, further comprising, in further response to detecting the anomaly, notifying the support service of the anomaly.

15. The method of claim 13, further comprising, in further response to detecting the anomaly, communicating with the support service to indicate the anomaly to the support service, wherein the communicating is performed through a second base station other than the first base station.

16. The method of claim 13, wherein the detecting further comprises analyzing radio transmissions of the first base station without communicating with the first base station.

17. The method of claim 13, wherein the detecting comprises obtaining data from an environmental sensor to detect one or more of:
   a power outage;
   abnormal temperature;
   a seismic event;
   water;
   abnormal humidity;
   vibration;
   movement; or
   electromagnetic interference.

18. The method of claim 13, wherein the detecting comprises determining that there is an outage of mains power, the method further comprising operating from a battery during the outage of the mains power.

19. The method of claim 13, wherein the detecting comprising detecting an inability of the telecommunications handset to connect to the cellular communications network through the first base station.

20. The method of claim 13, wherein the detecting comprising detecting that the current cellular identification associated with the cellular connection is different from the cellular identification of the first base station.

* * * * *